(12) United States Patent
Collet et al.

(10) Patent No.: US 9,574,501 B2
(45) Date of Patent: Feb. 21, 2017

(54) METHOD FOR GROUNDING AN ELECTRICAL COMPONENT

(71) Applicant: Valeo Systemes de Controle Moteur, Cergy Saint Christophe (FR)

(72) Inventors: Thomas Collet, Nesles la Valle (FR); Didier Le Cunff, Carriere Sous Poissy (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days.

(21) Appl. No.: 14/434,522

(22) PCT Filed: Oct. 8, 2013

(86) PCT No.: PCT/FR2013/052403
§ 371 (c)(1),
(2) Date: Apr. 9, 2015

(87) PCT Pub. No.: WO2014/057214
PCT Pub. Date: Apr. 17, 2014

(65) Prior Publication Data
US 2015/0275775 A1    Oct. 1, 2015

(30) Foreign Application Priority Data

Oct. 12, 2012    (FR) ..................... 12 59740

(51) Int. Cl.
*F02D 9/10*    (2006.01)
(52) U.S. Cl.
CPC ............. *F02D 9/107* (2013.01); *F02M 26/72* (2016.02); *F02M 26/74* (2016.02); *Y10T 29/49117* (2015.01)

(58) Field of Classification Search
CPC .. F02D 9/10; F02D 1/00; F02M 26/74; Y02T 10/121
(Continued)

(56) References Cited

U.S. PATENT DOCUMENTS

| 5,319,864 A * | 6/1994 | Amonett | ............ | H01H 43/024 34/528 |
| 6,407,543 B1 * | 6/2002 | Hagio | ............ | B60K 37/02 123/617 |

(Continued)

FOREIGN PATENT DOCUMENTS

| DE | 10 2010 042 079 A1 | 4/2012 |
| FR | 2 854 654 A1 | 11/2004 |

OTHER PUBLICATIONS

International Search Report for corresponding International Application No. PCT/FR2013/052403, mailed Dec. 3, 2013 (2 pages).

*Primary Examiner* — Dion R Ferguson
*Assistant Examiner* — Mandeep S Buttar
(74) *Attorney, Agent, or Firm* — Osha Liang LLP

(57) ABSTRACT

A method for grounding an electrical component received in a body (2) capable of being assembled to a cover (3), the cover (3) being in electrical contact with the electrical component when it is assembled on the body, said method involving: positioning the cover (3) relative to the body (2) using a centering piece (8) arranged in the body (2) and in electrical contact with the body (2), and assembling the cover (3) positioned in this way on the body (2) in such a way that the cover (3) is in electrical contact with the centering piece (8) and in electrical contact with the electrical component.

7 Claims, 2 Drawing Sheets

Figure 1:
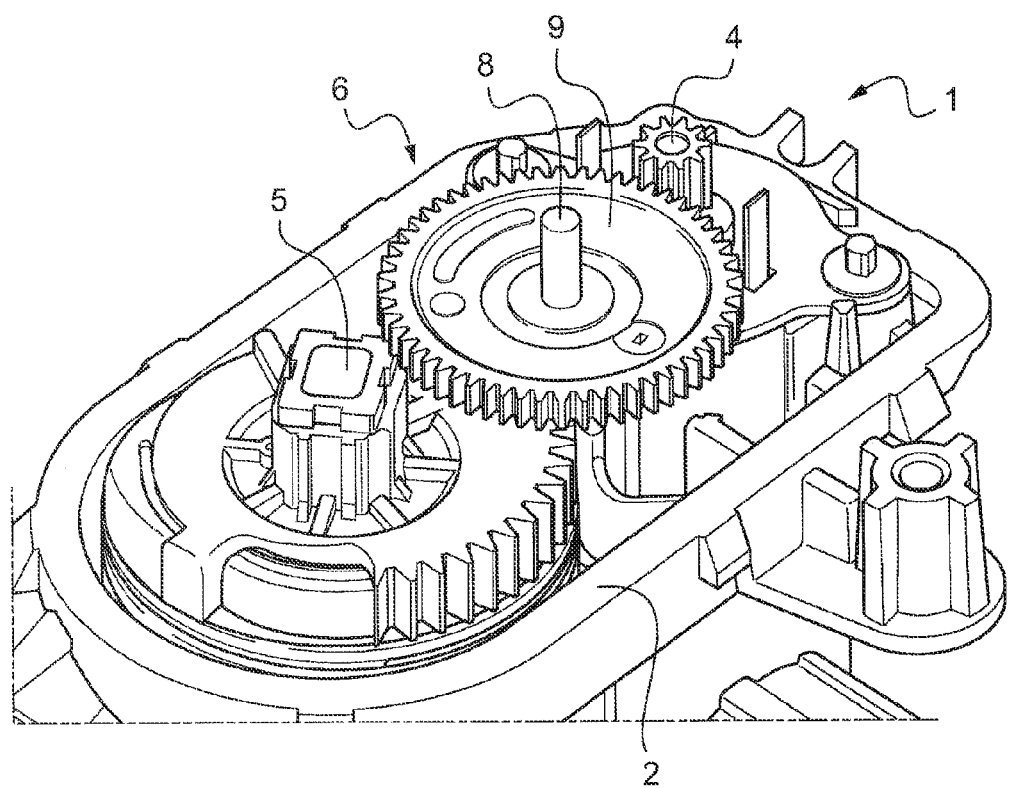

(58) Field of Classification Search
USPC .......................................... 361/769; 29/825
See application file for complete search history.

(56) References Cited

U.S. PATENT DOCUMENTS

| | | | |
|---|---|---|---|
| 6,591,809 B2 * | 7/2003 | Saito ................... | F02D 9/1065 123/361 |
| 2005/0183695 A1 | 8/2005 | Keefover et al. | |
| 2013/0160738 A1 * | 6/2013 | Cowan ................... | F02D 9/105 123/399 |

\* cited by examiner

METHOD FOR GROUNDING AN ELECTRICAL COMPONENT

The present invention relates to earthing an electrical component. The electrical component is in particular an electric motor.

The invention is used preferably but not exclusively for earthing an electrical component which is used in association with a heat engine, in particular of a vehicle.

The electrical component is, for example, an electric actuator motor for at least one flap or piston which is arranged in the air circuit of the heat engine.

In the context of the invention, the term "heat engine air circuit" is intended to be understood to be the circuit between the intake inlet and the exhaust outlet of the heat engine. The flap or the piston may be arranged in the intake circuit, the exhaust circuit or a recirculation loop through which the exhaust gases pass before being reinjected into the intake (EGR).

The flap is, for example, part of a valve.

It is known, in order to ensure the earthing of an electric motor of a valve actuator which is mounted in a body whose cover is of plastics material and carries electrically conductive tracks, to use an additional component such as a spring which is in electrical contact, on the one hand, with the body of the valve and, on the other hand, with the tracks of the cover. The earthing of the electrical component is then carried out via electrically conductive tracks and the spring as far as the body of the valve. This solution has the disadvantage of involving the addition of a component and involving the dedication of zones of the body of the valve and the tracks of the cover to contact with the additional component. Furthermore, a step of positioning this additional component in the body is required.

There is a requirement to carry out the earthing of an electrical component which is arranged in a body, in a relatively simple manner, which requires little space and which involves little cost.

An object of the invention is to comply with this requirement and it achieves this according to one of the aspects thereof using a method for earthing an electrical component which is received in a body which is capable of being assembled with a cover, the cover being in electrical contact with the electrical component when it is assembled on the body, in which method:
- the cover is positioned relative to the body using a centering component which is arranged in the body and in electrical contact with the body, and
- the cover is assembled in a state positioned in this manner on the body so that the cover is, on the one hand, in electrical contact with the centering component and, on the other hand, in electrical contact with the electrical component.

According to the above method, the earthing of the electrical component is obtained by means of a continuity of electrical contact between the body and the electrical component by means of the centering component and the cover. An additional function is thus added to a component which is required for the assembly of the cover on the body in order to correctly position the cover on the body, that is to say, to ensure the continuity of the electrical contact. The use of an additional component in order to ensure the, earthing of the electrical component is thereby avoided.

At least one electrically conductive tongue may move into contact with the centering component when the cover is assembled on the body. This electrically conductive tongue may allow the cover and the centering component to be in electrical contact following the method, and therefore the cover and the body to be in electrical contact. The electrical tongue is thus interposed between the cover and the centering component when the cover is assembled on the body.

The centering component may extend completely or partially along a longitudinal axis and the tongue may extend completely or partially along a portion of the axis along which a portion of the centering component also extends. In other words, the centering component and the tongue may overlap along the axis.

The tongue may be flexible, or resiliently deformable.

The cover may comprise a wall of plastics material and at least one electrically conductive track which is carried by the wall. The electrically conductive tracks carried by the cover are further referred to as a "leadframe".

The tongue may be in electrical contact with the electrically conductive track of the cover. In this manner, the electrically conductive track(s) of the cover is/are in electrical contact with the tongue, which is in electrical contact with the centering component, which is itself in electrical contact with the body. The electrical component is thus earthed following the method.

The tongue forms, for example, the extension of an electrically conductive track of the cover, being produced in one piece therewith. In a variant, the tongue and the track are separate and in contact with each other.

The cover may further comprise one or more other electrically conductive tracks which serve to supply electrical power to the electrical component.

The electrical component may not be in electrical contact with the body directly and the invention allows an electrical contact to be established indirectly between the electrical component via the cover and the centering component.

The tongue may comprise a proximal portion which extends parallel with the surface of the wall of the cover, an intermediate portion which extends obliquely from the proximal portion in a first direction and a distal portion which extends obliquely from the intermediate portion in a second direction which intersects with the first direction so that the tongue has an S-shape. This shape of the tongue may provide the flexibility thereof, or the resiliently deformable nature thereof. In a variant, the tongue is already produced from a flexible material and the shape of the tongue further increases the flexibility thereof, or the resiliently deformable nature thereof.

The centering component may be a cylinder having a circular cross-section and a plurality of tongues may be arranged on the periphery of the cylinder cross-section.

The cover may comprise a bearing which is configured to cooperate with the centering component in order to position the cover relative to the body. The tongue may thus comprise at least one portion which, when the centering component is not received in the bearing, is at a distance from the center of the bearing less than the radius of the centering component. In the rest state, the tongue thus comprises a portion arranged in the space which will be occupied by the centering component when the body and the cover are assembled. When the tongue is resiliently deformable, the resilience thereof thus keeps it in contact with the centering component when it is in the bearing since the resilience thereof has a tendency to return it to the rest position thereof. A permanent contact can thus be obtained between the tongue and the centering component when the centering component is in the bearing.

The bearing may comprise a plurality of reliefs which cooperate with the centering component in order to ensure the positioning of the cover relative to the body. These reliefs may be distributed in a discrete manner over the periphery of the bearing and at least two consecutive reliefs of the bearing may be separated by a tongue. These reliefs are, for example, flat portions.

The centering component is, for example, of steel. The centering component may be connected to the body, in particular being fitted in the body.

The electrical component may be an electric motor.

The body is, for example, a valve body of an air circuit of a heat engine. The electric motor may thus serve to move at least one flap or at least one valve member of the valve. The valve is, for example, a gas recirculation valve (EGR) and may be a "two-way" valve or a "three-way" valve.

The electric motor is, for example, a direct current motor or a synchronous motor with permanent magnets. The electric motor may have a nominal torque up to 200 mN.m.

The body may comprise a transmission stage which is arranged between the electric motor and a member to be moved and the transmission stage may comprise at least one shaft which forms the centering component.

In the application above in a valve, the member to be moved is, for example, a flap or a valve member of the valve, the valve being able to be moved in translation or in rotation. The transmission step thus comprises an intermediate shaft which is arranged between the output shaft of the electric motor and a shaft of the flap or the valve member.

Where applicable, the transmission stage comprises a plurality of shafts in series between the output shaft of the electric motor and the shaft of the flap or the valve member, and the shaft which forms the centering component is one of these shafts in series.

The assembly of the cover on the body may involve fixing the cover and the body to each other, for example, by means of screwing, welding, adhesive bonding, snap-fitting, crimping, riveting or snap-riveting.

According to another of the aspects thereof, the invention further relates to an assembly comprising:
 a body in which a centering component and an electrical component are arranged, the body being in electrical contact with the centering component,
 a cover which is configured to cooperate with the centering component in order to ensure positioning of the cover relative to the body and to be in electrical contact, on the one hand, with the centering component and, on the other hand, with the electrical component when it is assembled on the body.

The assembly may in particular form all or a portion of a valve of a heat engine air circuit.

All or some of the features mentioned above with respect to the method apply to the whole.

The cover may comprise at least one electrically conductive track which is in electrical contact with the electrical component when the cover is assembled on the body.

Figure 2:
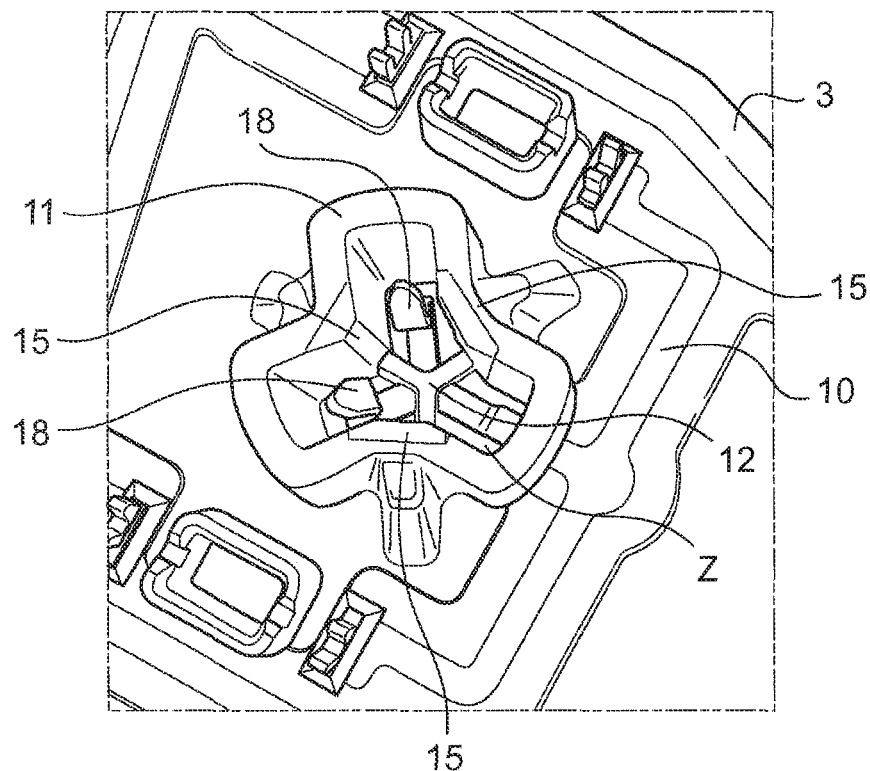
Figure 3:
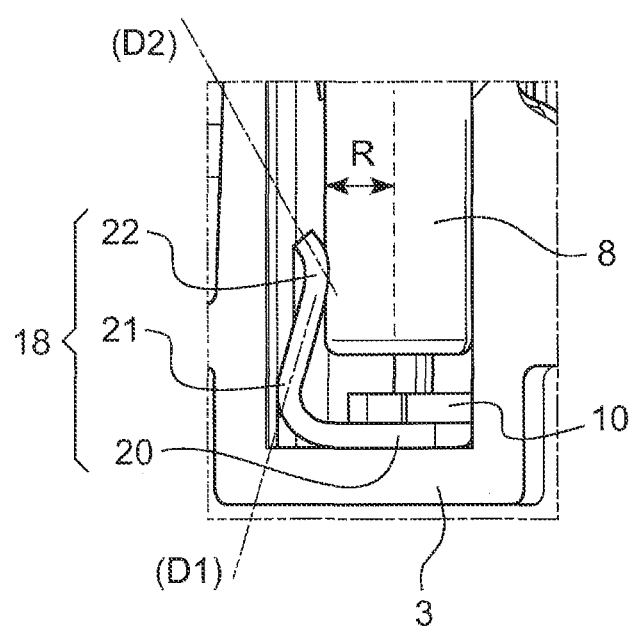

The invention may be better understood from a reading of the following description of a non-limiting embodiment thereof and an examination of the appended drawings, in which:

FIG. 1 is a schematic front elevation of an assembly according to an embodiment of the invention, without a cover, FIG. 2 is a bottom view of the cover which is capable of cooperating with the body illustrated in FIG. 1, and FIG. 3 is a detailed view of an example for establishing a continuity of electrical contact between the intermediate shaft and the cover after assembly of the cover on the body.

FIG. 1 shows an assembly 1 according to an embodiment of the invention. The assembly 1 forms in this instance a valve, only a portion of which has been illustrated. It is, for example, a "two-way" valve or a "three-way" valve which is used to control the flow of the EGR gases which are reinjected at the intake of a heat engine of a motor vehicle.

The assembly 1 comprises a body 2 and a cover 3 which cannot be seen in FIG. 1 but which is illustrated in FIG. 2. The body 2 surrounds an electric motor which comprises a metal housing, for example, of steel. The body 2 is, for example, produced from aluminum.

The electric motor comprises an output shaft 4 whose position may be controlled by a sensor 5. As illustrated in FIG. 1, the body 2 comprises a housing in which there is arranged a transmission stage 6 via which the movement of the output shaft of the engine can actuate the flap of the valve. This transmission stage 6 comprises in the example in question an intermediate shaft 8 which carries a pinion 9 which engages with a pinion which is fixedly joined to the output shaft of the engine.

The intermediate shaft 8 is in this instance cylindrical having a circular cross-section. It may in the example in question be produced from non-processed steel.

The intermediate shaft is attached to the body 2, being in particular fitted therein, so that the intermediate shaft 8 is in electrical contact with the body 2 of the assembly 1.

The cover 3 comprises in the example in question a wall of plastics material on which an electrically conductive track 10 is arranged.

The cover 3 further comprises in the example illustrated a bearing 11 which allows the cover 3 to be correctly positioned relative to the body 2 using the intermediate shaft 8 which acts as a centering component of the cover 3 on the body 2. The bearing 11 comprises in this example a wall which surrounds the zone Z which is intended to receive the end of the intermediate shaft 8 opposite the end which is fitted to the body. The zone Z is in this instance Y-shaped when it is viewed from below and the transition from one branch to the other of the Y-shape is carried out via a relief 15 which cooperates with the intermediate shaft 8 in order to ensure the correct positioning of the cover 3 relative to the body 2.

In the example described, three reliefs 15, which are in this instance flat portions, are arranged in a discrete manner on the periphery of the bearing. Two consecutive reliefs are separated from each other by an angle of 120° measured from the center of the bearing 11.

As can be seen in FIG. 2, two tongues 18 are provided, the tongues 18 originating from the electrically conductive track 10. Each of these tongues 18 is in the example in question arranged between two reliefs 15, occupying the free space provided between two consecutive reliefs 15.

A tongue 18 will now be described with reference to FIGS. 2 and 3.

As can be seen, each tongue 18 may be S-shaped, comprising a proximal portion 20 which extends parallel with the plastic wall of the cover 3, an intermediate portion 21 which extends in a first oblique direction D1 and a distal portion 22 which extends in a second oblique direction D2, the directions D1 and D2 intersecting with each other.

As can be seen in FIG. 2, when the end of the intermediate shaft 8 is not received in the zone Z of the bearing 11, the distal portion 22 of the tongue 18 occupies inside the bearing 11 a position which is occupied by the shaft 8 when it cooperates with the bearing 11. The distal portion 22 thus has a rest position in which it is located at a radial distance from the center 12 of the bearing 11 less than the radius R of the intermediate shaft 8.

Each tongue 18 is in this instance resiliently deformable so that the introduction of the intermediate shaft 8 in the zone Z in order to carry out the positioning of the cover 3 relative to the body 2 moves the intermediate portion 21 and the distal portion 22 away from the center 12 of the bearing 11. As a result of the resiliently deformable nature thereof, the tongue 18 has a tendency to return to the rest position thereof so that the intermediate portion 21 and distal portion 22 of the tongue are permanently pressed against the intermediate shaft 8 when it is received in the bearing 11.

A force F of at least 5 N can be applied by each tongue 18 to the intermediate shaft 8.

A continuity of electrical contact thus exists in the example described between the casing 2 and the electric motor when the cover 3 is assembled on the body 2, for example, by means of screwing, adhesive bonding, welding, snap-fitting, crimping, riveting, snap-riveting or some other means.

This is because the track 10 of the cover 3 is connected to the electric motor and it is also in electrical contact with the tongues 18. The tongues 18 are in electrical contact with the intermediate shaft 8 which itself is in electrical contact with the body 2. An earthing of the electric motor is thus ensured and serves to actuate one or more flaps of the valve using the intermediate shaft 8 which is further used in order to correctly position the cover 3 relative to the body 2, before carrying out the fixing of the cover 3 and the body 2 to each other.

In the example in question, the cover 3 carries other electrically conductive tracks in order to supply the electric motor with electrical power. The electrical supply and the earthing of the electric motor are thus carried out in this example via the cover 3.

The invention is not limited to the specific application which has been described above.

The expression "comprising a" must be understood to be synonymous with the expression "comprising at least one" unless otherwise specified.

The invention claimed is:

1. A method for earthing an electrical component which is received in a body that is assembled with a cover, the cover being in electrical contact with the electrical component when the cover is assembled on the body, the method comprising:
    positioning the cover relative to the body using a centering component which is arranged in the body and in electrical contact with the body; and
    the cover is assembled in a state positioned in this manner on the body so that the cover is in electrical contact with both the centering component and the electrical component,
    wherein a plurality of electrically conductive tongues located within the cover move into contact with the centering component when the cover is assembled on the body,
    wherein at least one of the plurality of tongues is in electrical contact with an electrically conductive track of the cover,
    wherein the centering component is a cylinder which has a circular cross-section and wherein the plurality of tongues is arranged on the periphery of the cylinder,
    wherein the cover comprises a bearing which is configured to cooperate with the centering component in order to position the cover relative to the body, and
    wherein at least one of the plurality of tongues comprises at least one portion which, when the centering component is not received in the bearing, is at a distance from the center of the bearing less than the radius of the centering component.

2. The method as claimed in claim 1, wherein the cover comprises a wall of plastics material and at least one electrically conductive track which is carried by the wall.

3. The method as claimed in claim 1, wherein the tongue comprises a proximal portion which extends parallel with the surface of the wall of the cover, an intermediate portion which extends obliquely from the proximal portion in a first direction, and a distal portion which extends obliquely from the intermediate portion in a second direction which intersects with the first direction so that the tongue has an S-shape.

4. The method as claimed in claim 1, wherein the electrical component is an electric motor and wherein the body is a valve body for a heat engine air circuit.

5. The method as claimed in claim 4, wherein the body comprises a transmission stage for the movement of the electric motor to at least one flap of the valve, the transmission stage comprising at least one shaft which forms the centering component.

6. An assembly comprising:
    a body in which a centering component and an electrical component are arranged, the body being in electrical contact with a centering component,
    a cover which is configured to cooperate with the centering component in order to ensure positioning of the cover relative to the body and to be in electrical contact, on the one hand, with the centering component and, on the other hand, with the electrical component when the cover is assembled on the body,
    wherein a plurality of electrically conductive tongues located within the cover move into contact with the centering component when the cover is assembled on the body,
    wherein at least one of the plurality of tongues is in electrical contact with an electrically conductive track of the cover,
    wherein the centering component is a cylinder which has a circular cross-section and wherein the plurality of tongues is arranged on the periphery of the cylinder,
    wherein the cover comprises a bearing which is configured to cooperate with the centering component in order to position the cover relative to the body, and
    wherein at least one of the plurality of tongues comprises at least one portion which, when the centering component is not received in the bearing, is at a distance from the center of the bearing less than the radius of the centering component.

7. The assembly as claimed in claim 6, forming all or a portion of a valve of a heat engine air circuit.

* * * * *